Inventor
Charles T. Banks.

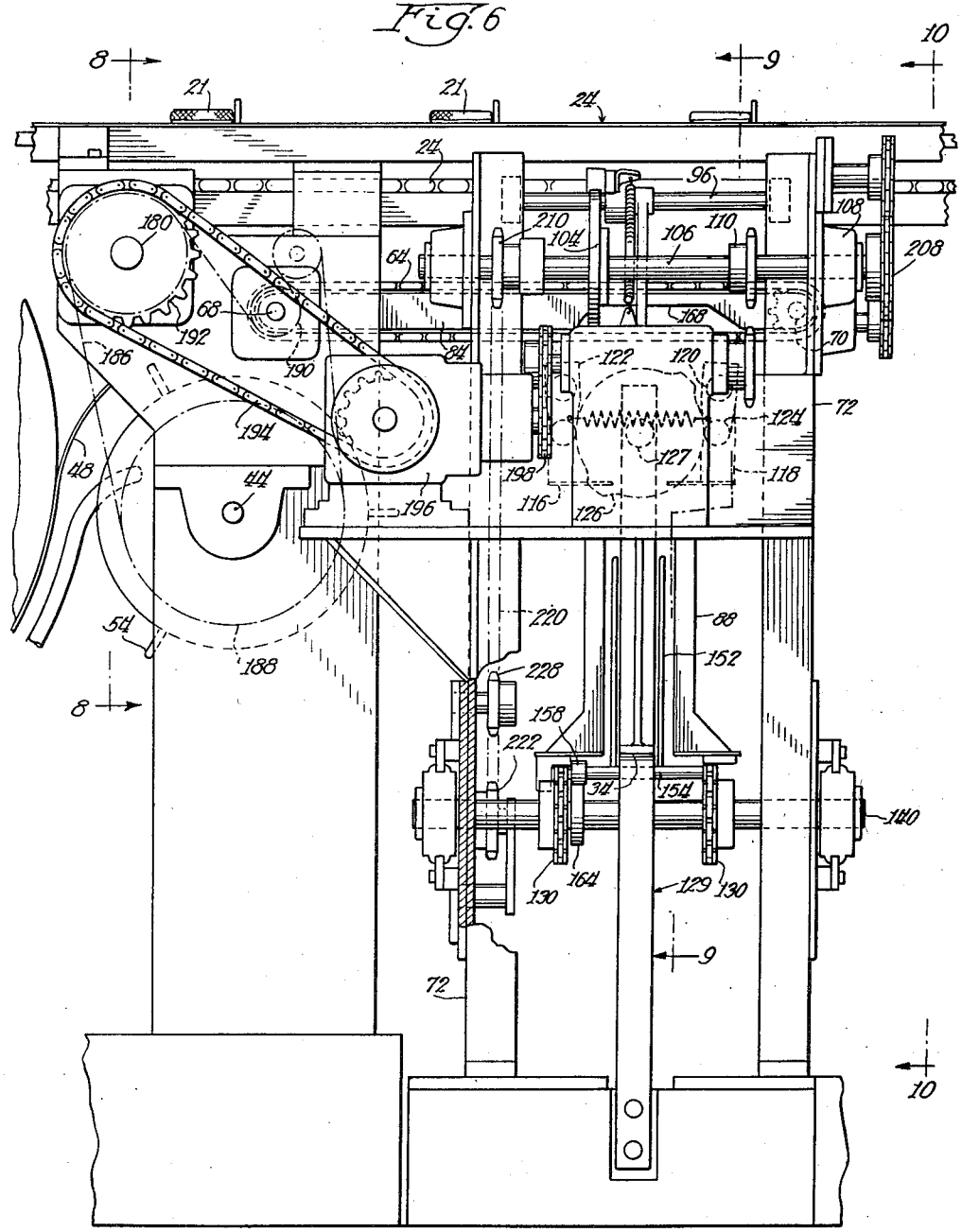

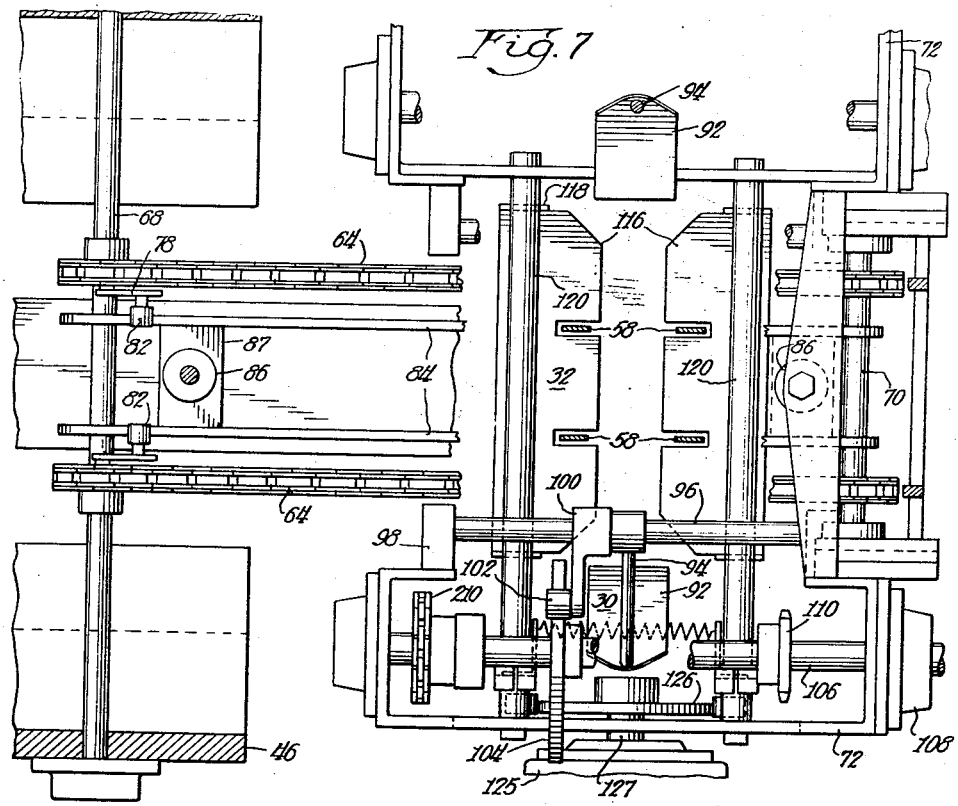
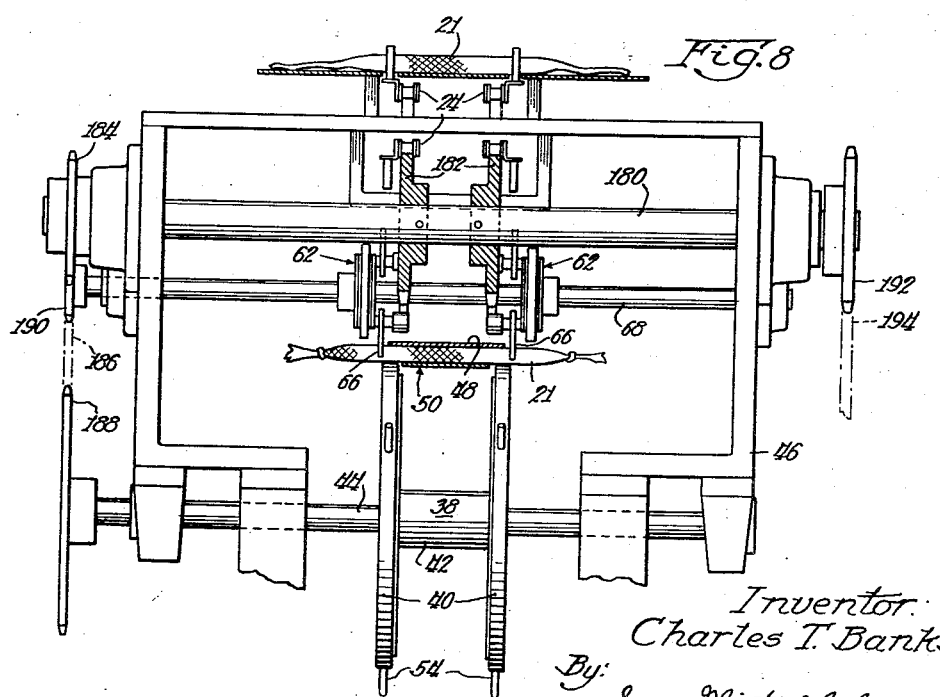

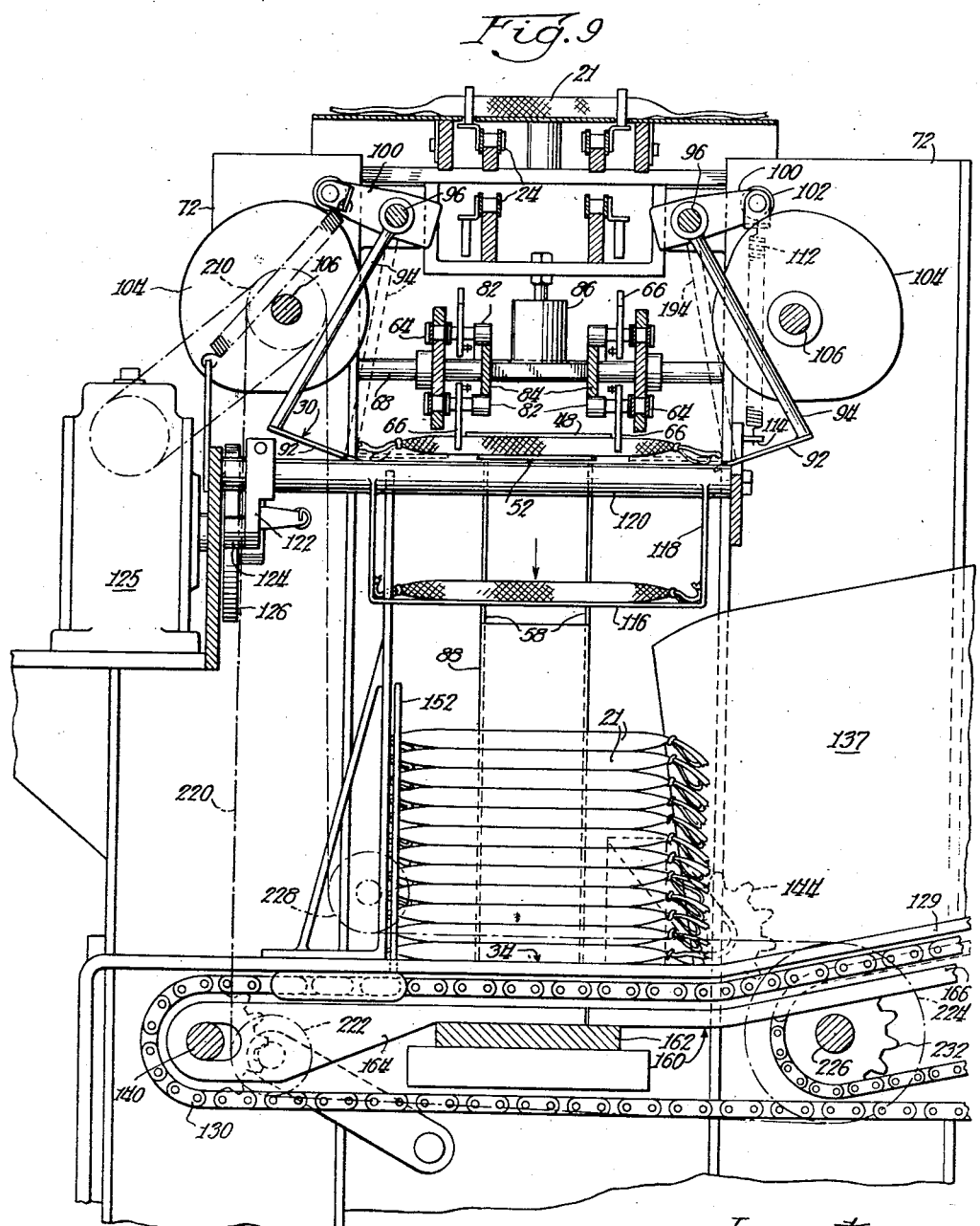

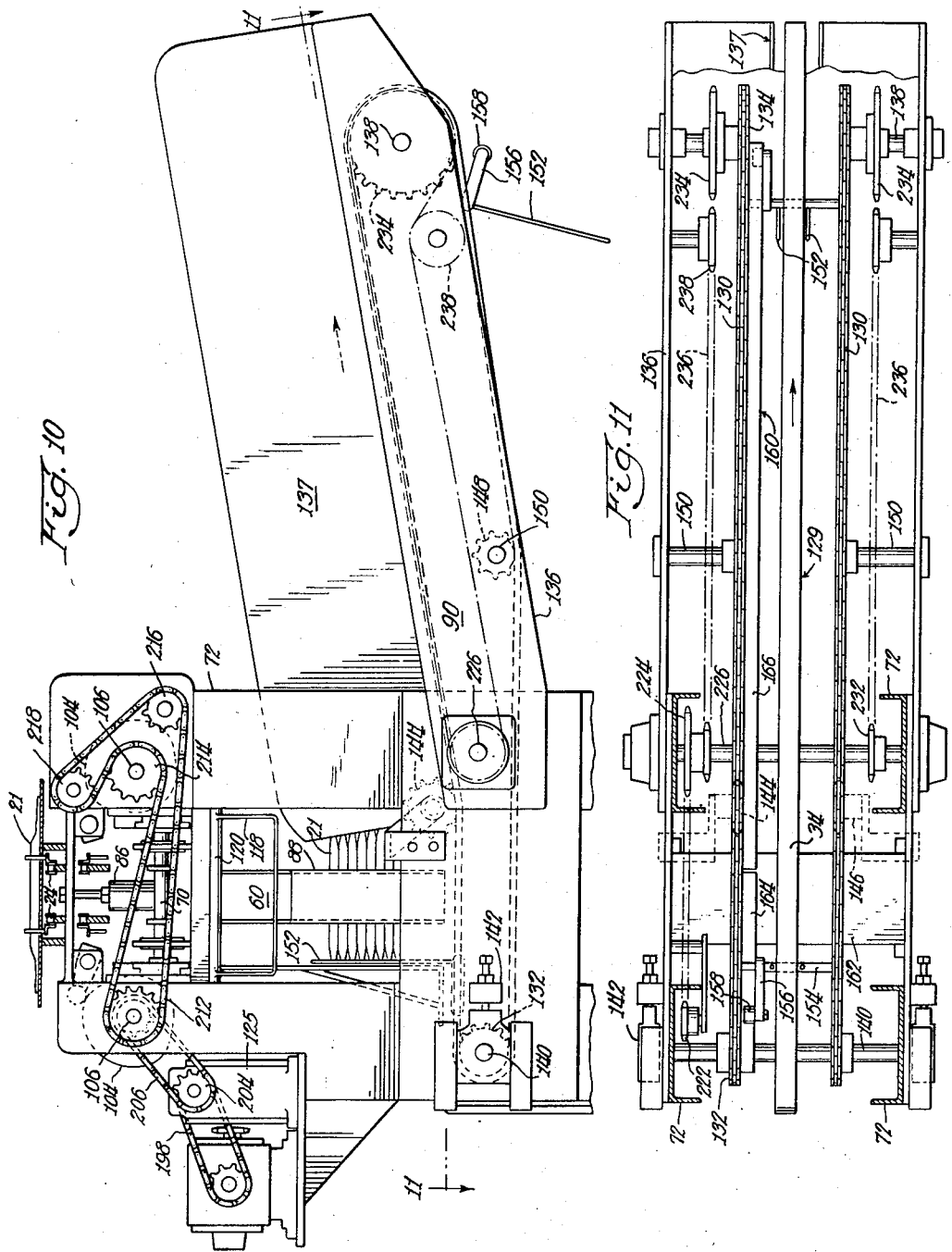

United States Patent Office 2,759,615
Patented Aug. 21, 1956

2,759,615

APPARATUS FOR COLLECTING ARTICLES FOR PACKAGING

Charles T. Banks, Neenah, Wis., assignor, by mesne assignments, to Kimberly-Clark Corporation, a corporation of Delaware Application April 14, 1952, Serial No. 282,137

5 Claims. (Cl. 214—6)

This invention relates generally to the handling of articles for packaging and is more particularly concerned with the collection of a predetermined number of articles praparatory to packaging same.

In the current methods of manufacture and packaging of items, wherein continuity of action is the general theme, it is important that each operation along the assembly line be as simple as possible and still be conducive to high speed operation. One such operation is the assembling of a specified number of the manufactured articles for packaging. The present invention is directed to an improved apparatus for performing this article assembling or collecting operation.

It is the principal object of this invention to provide an improved method and apparatus for removing material from a moving conveyor, and for collecting such material for packaging.

Other objects of the present invention are to provide methods and apparatus of the type described which afford continuous, high-speed flow of the articles to the packaging machine, handle the articles in a manner affording uniform stacking thereof, and which avoid the use of reciprocating parts and other complicated mechanisms.

Other objects and advantages will be more apparent as reference is had to the accompanying specification and drawings, wherein:

Figure 6 is an elevational view along line 6—6 in Figure 2;

Figure 7 is a plan view of the structure in Figure 3, with parts broken away and in section;

Figure 8 is a sectional view along line 8—8 in Figure 6;

Figure 9 is a section taken along line 9—9 in Figure 6;

Figure 10 is a reduced-scale end view taken along the line 10—10 in Figure 6; and Figure 11 is a section taken along line 11—11 in Figure 10.

Figure 1:
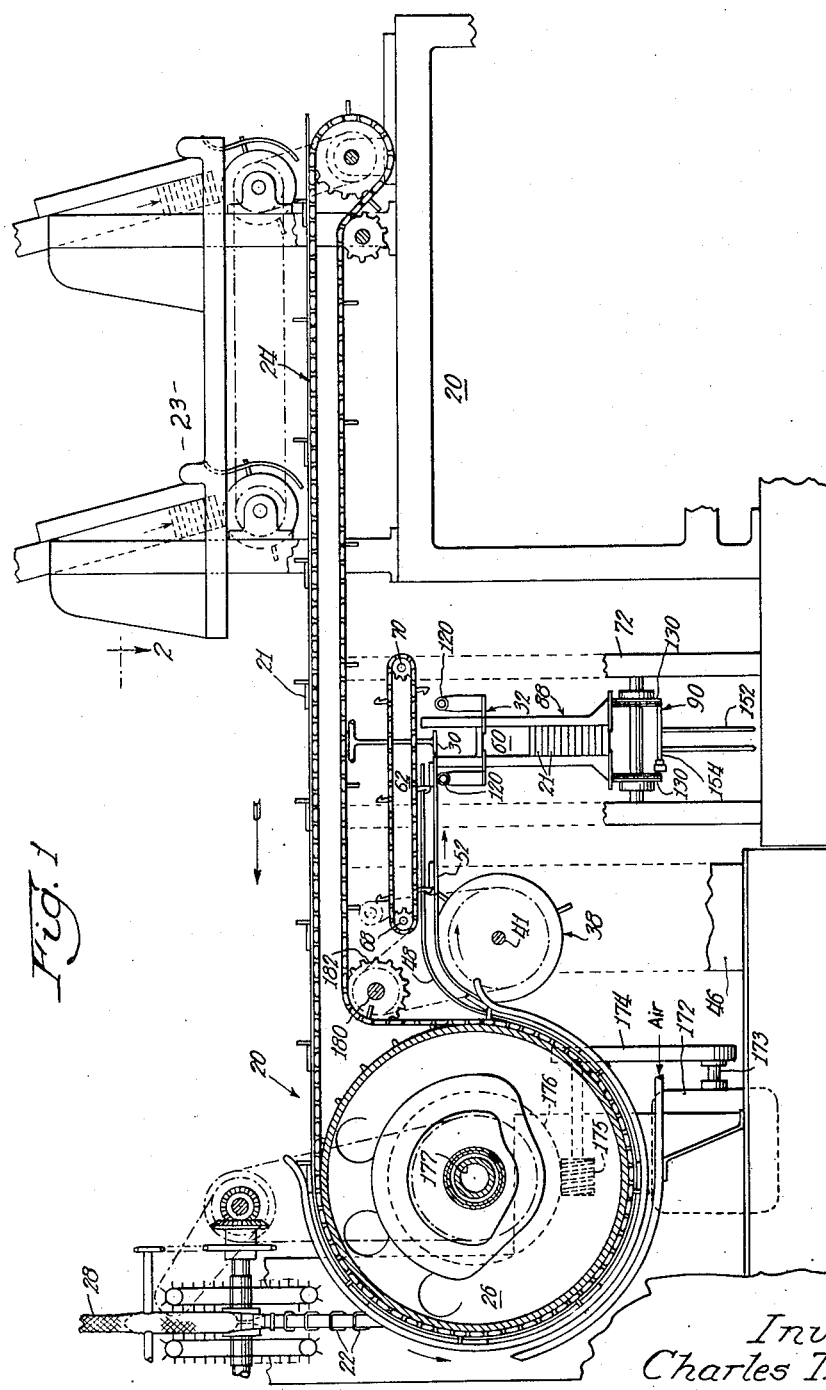
Figure 1 is a schematic illustration of a machine including an embodiment of the improved apparatus comprising the present invention.
Figure 2:
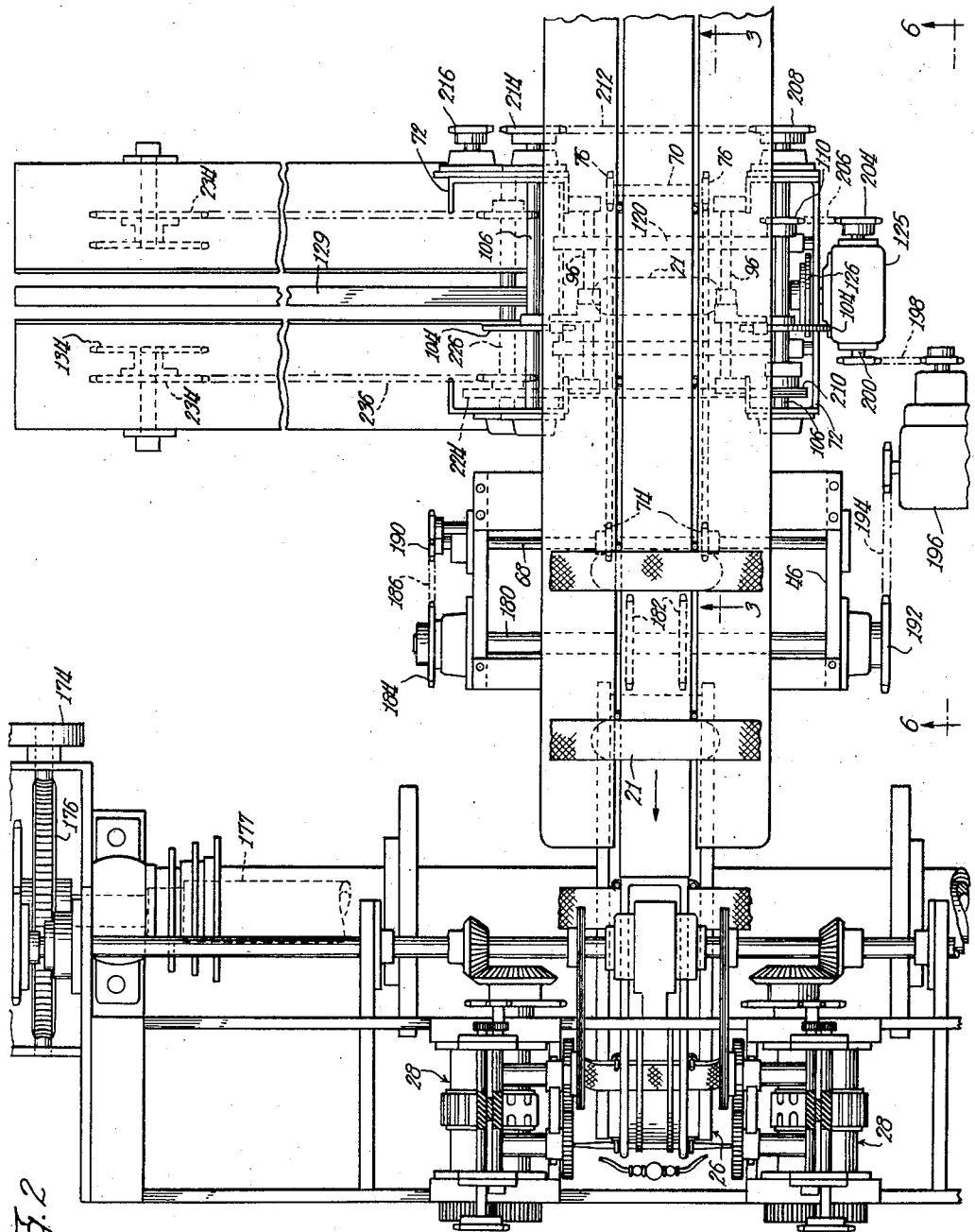
Figure 2 is an enlarged partial plan view of the machine, taken along line 2—2 in Figure 1.

Referring particularly to the structure shown in Figures 1 and 2, it will be seen that the machine chosen to illustrate applicant's invention comprises a machine 20 designed for use in the manufacture of sanitary napkins 21, whereby attachment loops 22 are secured to opposite ends of the sanitary napkin or pad. The machine 20 includes a magazine feed 23 for supplying the unlooped napkins to a conveyor 24 for movement therewith around a rotating drum 26.

The drum 26 has fixed thereto a series of loop attaching units (not shown) which receive the loops 22 of knitted fabric from a loop forming device 28 and secure same in position on opposite ends of each of the sanitary napkins 21 as they are carried by the conveyor 24 around the path of the rotating drum 26. A more detailed description of the loop-forming and attaching mechanism may be had by referring to the co-pending application, Banks et al., Serial No. 282,136, filed April 14, 1952.

The conveyor 24 and the loop attaching mechanisms associated therewith are intended for high speed operation and, therefore, suitable means must be provided for handling the looped sanitary napkins as they leave the drum 26. Furthermore, it is desirable that such means include mechanism for collecting a desired number of the finished napkins in readiness for packaging.

In the illustrated embodiment of the present invention there is provided simplified structure for receiving, stacking, and carrying away the finished napkins which is capable of high speed operation and, therefore, does not detract from the high speed operation of the loop forming and attaching mechanisms. Furthermore, this improved structure occupies a minimum of space and is adapted for operation in closely adjacent relation to the loop attaching mechanism.

Broadly, the collecting and stacking operation is achieved by the use of a series of vertically spaced, platform structures which receive each of the finished napkins in turn and which are arranged for cyclical operation to effect a progression of the napkins toward a packaging machine. A first movable platform 30 (Figure 3) receives each napkin and then discharges same to a lower movable platform 32 where a plurality of napkins are collected prior to releasing them for further downward movement on to a third stationary platform 34.

A conveyor 90 operates in conjunction with the third platform 34 so that when a predetermined number have been released thereto by the lower platform 32 such predetermined number of napkins is carried away to a suitable packaging machine (not shown).

Figure 3:
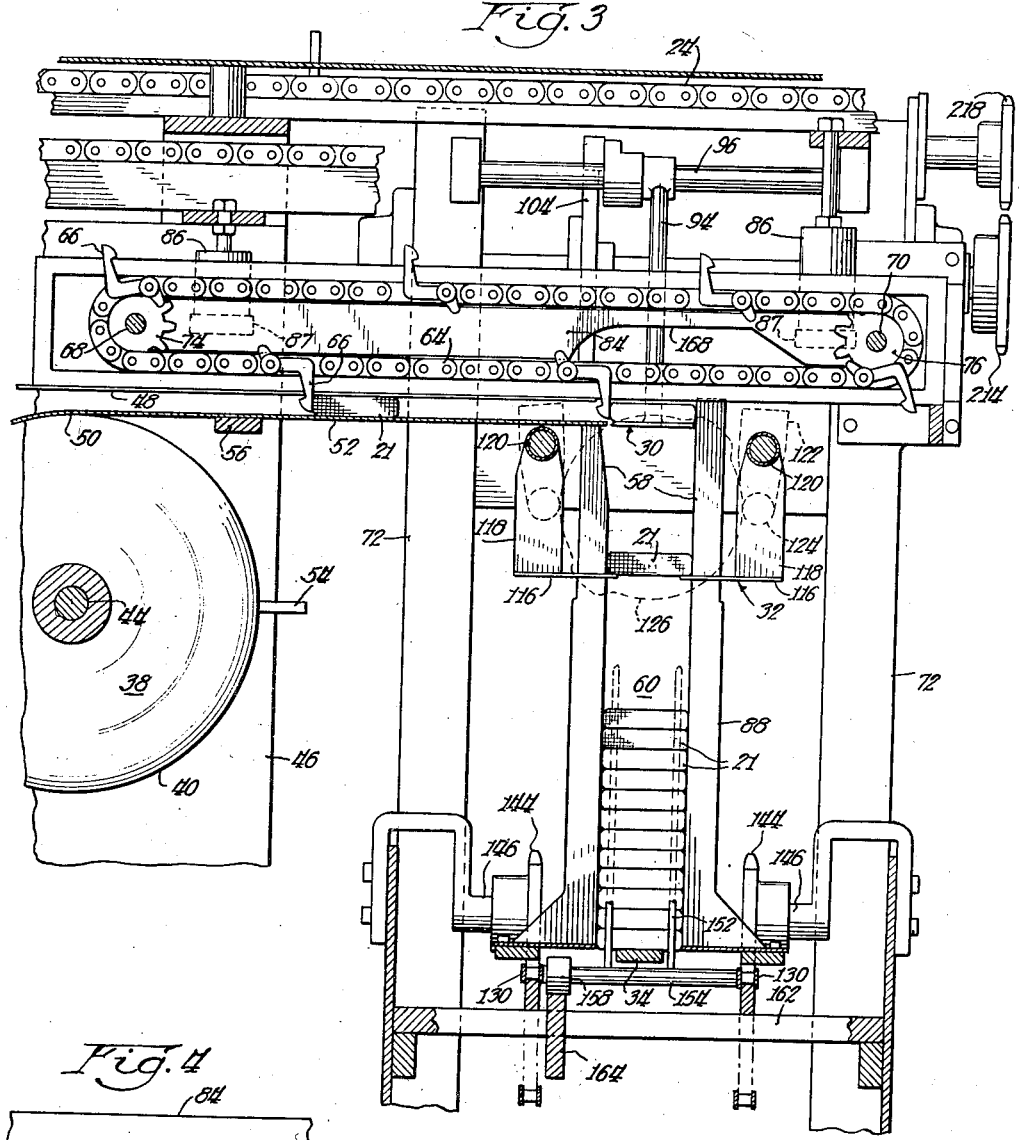
Figure 3 is a sectional view taken along the line 3—3 in Figure 2.

Referring now to Figures 1 and 3, it is seen that the detailed embodiment of applicant's invention includes a pick-up wheel 38 which is disposed at the rear of the drum 26 (right side in the drawings). The pick-up wheel 38 comprises a pair of coaxial discs 40 (Figure 8) secured together by a hub 42 which is fixed to a cross shaft 44 suitably journalled in the side frame members 46 of the machine 20.

The rear side of the drum 26 has fixed thereto a curved strap 48 which extends in overlying relation to the pick-up wheel 38 for directing the looped pads toward the latter. The gap between the upper edges of the discs 40 is substantially closed by a suitably curved stationary member 50 (Figure 3) which extends rearwardly along a horizontal line toward a pad collecting structure 60 and thus provides a platform support 52 for the sanitary napkins as they move rearwardly from the drum. A series of circumferentially spaced pairs of pins 54 on the pick-up wheel 38 provide the means for taking the napkins 21 from the drum 26 and moving them on to the platform 52.

The platform 52 is supported at its forward end by a cross bar 56 (Figure 3) extending between the side frame members 46, and at its rear end by the upper ends of a pair of vertical posts 58 which form the upper portion of the vertical bin 60 for collecting the sanitary napkins.

Figure 4:
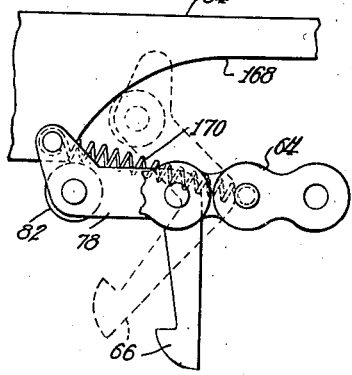
Figure 4 is an enlarged fragmentary view of the structure shown in Figure 3.
Figure 5:
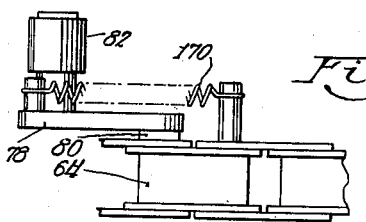
Figure 5 is a plan view of the structure in Figure 4.

Overlying the platform 52 is a conveyor 62 comprising a pair of endless chains 64 having spaced-apart fingers 66 projecting vertically therefrom in position for engaging each sanitary napkin, as it is brought onto the platform 52, to move the napkin rearwardly on the machine 20. Specifically, a pair of spaced-apart cross shafts 68 and 70 are suitably journalled, respectively, in bearings carried by the side frame members 46 forward on the machine and in bearings supported on a pair of vertical frame members 72 which are disposed at an intermediate portion of the machine. Each of the shafts 68 and 70 have fixed thereto a pair of sprockets 74 and 76, respectively, for supporting and driving the laterally spaced pair of endless chains 64. Spaced along each of these chains and mounted thereon for relative swinging movement are the previously mentioned fingers 66 which form one leg of an L-shaped member 78 (Figures 4 and 5) fixed at its vertex to a transverse pin 80 rotatably supported by a portion of the chain 64. The free end portion of the other leg has a roller 82 rotatably mounted thereon.

A cam plate 84 is disposed along the inner side of each of the chains 64 with its edges disposed for engagement by the rollers 82. As shown in Figures 3 and 9, the cam plates 84 are supported from overlying portions of the machine frame, as by the cylindrical parts 86 which are welded or otherwise secured to a pair of cross pieces 87 rigidly uniting the cam plates at opposite ends thereof.

At the rearward end of the platform 52, along which the looped pads are moved by action of the conveyor mechanism 62 just described, is the pad-receiving bin 60. This bin comprises at its lower portion a pair of spaced-apart vertical plate members 88 which are suitably supported between the adjacent machine frame members 72. The upper portion of the bin 60 includes the four posts 58 which are spaced (Figure 7) to permit passage of a sanitary napkin therebetween. In order to allow a predetermined number of the sanitary napkins to be taken from the bin 60, as by an endless conveyor mechanism 90, without interrupting the flow of the pads to the bin, there is provided the upper movable platform or gate 30 and the lower movable platform or gate 32, which control the fall of the pads in the bin. By controlling the movement of the pads through the bin 60, these gates 30 and 32 also thereby assist in keeping the pads in alignment during their movement toward the final packaging station (not shown).

The bin 60 is rectangularly shaped to conform generally with the size of a sanitary napkin. The upper gate 30 for the bin comprises a pair of platform members 92 (Figure 9) covering opposite end portions of the bin and disposed at the general level of the conveying platform 52 for the pads. The platform members 92 are each fixed to the lower end of an arm 94 which is fixed at its upper end to a shaft 96 (Figure 7) journalled at its opposite ends in bearings 98 carried by the vertical frame members 72 of the machine 20. A rocker arm 100 is also fixed at one end to this shaft 96 and has at its free end a roller 102 mounted on a spindle carried by the rocker arm 100 for relative rotation.

A cam 104 is carried by each of the machine frame members 72 in position for engagement with the roller 102 on the adjacent rocker arm 100. Each of the cams 104 is fixed to a cross shaft 106 which extends between the machine frame members 72 and is journalled in suitable bearings 108 carried by these members. A sprocket 110 is also fixed to each of the cross shafts 106 and connected in driven relation with a suitable source of power, as will be described later. Each of the rollers 102 is held against the peripheral surface of the associated cams 104 by a tension spring 112 which extends between the outer end of the rocker arm and a plate 114 extending from a lower portion of the supporting frame structure.

Spaced below the upper gate 30 is the lower gate 32 comprising a pair of relatively movable platform members 116. These platform members extend longitudinally of the bin 60 and move at right angles to the direction of movement of the upper gate sections 92. Each of the platform members 116 (Figure 9) is fixed to the lower end of a pair of arms 118 which in turn are fixed at their upper ends to a shaft 120 journalled at opposite ends thereof in vertical plate sections of the machine frame members 72.

At one end of the two shafts 120, which support the lower platform members 116, there is fixed a second pair of depending arms 122 (Figures 3 and 9) each having a roller 124 at its lower end. Interposed between these arms for engagement with the rollers 124 is a suitable cam 126. The cam is fixedly supported on a shaft 127 (Figure 7) journalled in the adjacent section of frame member 72 and extending therethrough for connection with the gear reduction unit 125.

The lower end of the receiving bin 60 has the platform portion 34 extending longitudinally thereof, which comprises a section of the stationary ribbon-like member 129 overlying the central portion of the endless conveyor mechanism 90. The conveyor mechanism 90 includes a pair of spaced-apart endless chains 130 (Figures 10 and 11) which are supported and driven by two pairs of sprockets 132 and 134, respectively, disposed at opposite ends of the conveyor. A pair of parallel elongated plate members 136 are bolted or otherwise secured at one end to the machine frame members 72 and project outwardly therefrom to support a trough extension 137 for the conveyor. The outer pair of sprockets 134 for the endless chains 130 are carried by coaxially aligned stub shafts 138 journalled in the outer ends of the extension plates 136. The inner pair of sprockets 132 are fixed to a shaft 140 which has its end portions journalled in adjustable bearing structures 142 carried by a lower portion of the frame members 72.

As seen particularly in Figures 10 and 11, the extension portion of the conveyor mechanism 90 is inclined upwardly from the lower platform 34 of the pad-receiving bin 60. To effect a corresponding change in the direction of the endless chains 130 there is provided a pair of sprockets 144 (one of which is shown) for engaging the upper flight of each of the chains. Each of the sprockets 144 are rotatably mounted on a stub shaft 146 (Figure 3) carried by the vertical side frame members 72 of the machine 20. A second pair of sprockets 148, engaging the upper surface of the lower flight of the endless chains 130, are fixed to a second pair of stub shafts 150 journalled at one end thereof in the spaced plate members 136 forming the extension for the conveyor 90.

For moving the sanitary napkins 21 out of the lower end of the bin 60 and through the chute or trough 137 supported by the conveyor extension plate members 136, there is mounted on the endless chains 130, for movement therewith, a series of vertically extending pusher rods 152. These pusher rods are disposed on opposite sides of the ribbon-like member 128, disposed along the center line of the conveyor, and each are fixed to a transverse rod 154 (Figure 11) supported between the endless chains 130. An arm extension 156 is fixed to each of the transverse rods 154, at right angles thereto, and carries a spindle mounted roller 158. The roller is disposed for engagement with the outer edge of a vertically arranged cam plate structure 160 suitably supported on the conveyor, as by means of the cross member 162 (Figure 9).

Because of the change in direction of the conveyor chains 130, the cam plate structure 160 is preferably made in two sections. A short cam plate section 164 underlying the bin 60 is supported at opposite ends thereof by the cross-shaft 140 and by the cross member 162 suitably secured between the machine side frame members 72. The portion of the cam plate structure 160 between the extension pates 136 of the conveyor 90 comprises an elongated cam plate 166, which is supported at one end by the cross member 162 and at the other end by the stub shaft 138 at the outer end of the trough 137. It will be seen, therefore, that the engagement of the roller 158 with the outer edge portions of the cam plate structure 160 maintains the pusher rods 152 in a vertical position during their movement along the upper path of the conveyor 90.

The pusher elements 152 travel along the upper path of the conveyor 90 until a suitable point is reached ahead of shaft 138. At that point the pushers 152 drop back rearwardly leaving the undisturbed stack of napkins on the center member 129 of the conveyor 90. The cam plate 166 is designed to allow the roller 158 to fall off the plate and rotate the pushers 152 rearwardly (Figure 10).

Drive mechanism

For effecting operation of the movable parts described heretofore there is provided drive mechanism suitably powered, as by the electric motor 172 (Figure 1). The motor 172 includes a drive shaft 173 connected by a belt and pulley arrangement 174, worm 175, and gear 176 (Figure 2) in driven relation to a center shaft 177 which carries the drum 26 for movement therewith.

The rotation of the drum 26 effects movement of the sanitary napkin feed conveyor 24 and, also, movement of the conveyor drive sprockets 182 (Figure 2), adjacent the rear of the drum 26, which are mounted on a cross shaft 180 suitably journalled in the side frame members 46.

A sprocket 184 fixed at one end of the shaft 180 is connected by a chain 186 with a sprocket 188 on the supporting shaft 44 for the pick-up wheel 38. The chain 186 also extends around a sprocket 190 on the adjacent end of the shaft 68 which supports the forward drive sprockets 74 for the conveyor mechanism 62 to provide for movement of this conveyor.

The opposite end of the shaft 180 has fixed thereto another sprocket 192 which is connected by a chain drive 194 with a miter gear unit 196 from which the power may be delivered through another chain 198 to the gear reducer unit 125. The gear reducer unit 125 has a pair of shafts 200 and 127 (Figure 7) projecting outwardly therefrom, generally at right angles to each other. The shaft 127 extends in the direction of the bin 60 and has mounted thereon the cam 126 which operates the lower gates 32.

The other shaft 200 of the gear reducer unit 125 has a sprocket 204 fixed thereto at one end which is connected by a chain 206 with the sprocket 110 on the adjacent shaft 106 mounting the cams 104 (Figure 7) for operating the adjacent upper gate sections 92. This cam shaft 106 has also fixed thereto two additional sprockets 208 and 210, and the sprocket 208 is connected by a chain 212 with a sprocket 214 on the cam shaft 106 at the opposite side of the bin 60 which operates the other upper gate section 92. A pair of intermediate sprockets 216 and 218 (Figure 10) are used in connection with chain 212 to effect movement of the sprockets 208 and 214 in opposite directions. The other sprocket 210 on the cam shaft 106 adjacent the gear reducer unit 125 is connected by a chain 220 with the drive sprockets for the conveyor mechanism 90 which is disposed at the lower end of the vertical stacking bin 60.

More specifically, the chain 220 extends around a sprocket 222 (Figure 9) adjacent the lower end of the bin 60, to a sprocket 224 fixed to a shaft 226 journalled in the lower portion of a pair of the frame members 72, and then around an idler sprocket 228 mounted on a stub shaft 230 (Figure 6) journalled in the adjacent side frame member 72 and back up to the sprocket 210 on the cam shaft 106. The drive for the outer end of the conveyor mechanism is provided by a chain and sprocket connection comprising a pair of sprockets 232 fixed to the shaft 226, a pair of idler sprockets 234 rotatable on the shafts at the outer end of the conveyor, and a pair of endless chains 236 extending from the sprockets 232 to the sprockets 234. A pair of idler sprockets 238 are used on the underside of the chains, adjacent the sprockets 234, to prevent interference of the bottom of the plate structure 136 with the chains 236.

Operation

Having in mind the arrangement of parts which comprise the illustrated embodiment of applicant's invention, description will be given of the operation of this mechanism.

As indicated previously, the looped pads 21 are successively taken from the rotating drum 26 by the action of the pins 54 on the pick-up wheel 38 and transferred to the stationary platform 52 disposed to the rear of the drum. At this point, a pair of the fingers 66, carried by the conveyor mechanism 62 disposed above platform, engage the pad 21 and push it along the platform 52 to a position overlying the upper gate 30, with the forward edge of the pad abutting the upwardly projecting rear pair of posts 58 of the vertical bin 60. The guide roller 82 for the finger 66 having reached a cut-out portion 168 of the cam plate 84, the fingers tilt away from the engaged edge of the pad, by tension exerted by a biasing spring 170 (Figure 4), to clear the pad and the bin structure. Having passed the bin structure, the finger-roller 82 again engages the horizontal edge of the plate 84 to return the finger 66 to its operating position, that is, projecting outwardly from the chain 64 in fixed relation thereto.

Almost simultaneously with the placement of the sanitary napkin on the upper gate 30, the two sections 92 thereof swing outwardly to permit the napkin to fall on to the lower gate 32, and then immediately swing back in closed position for receiving another pad. A predetermined number of sanitary napkins, preferably three or four with the disclosed apparatus, are placed in this manner on the platform formed by the lower gate structure 32 prior to the opening of the lower gate. Having accumulated this predetermined number of sanitary pads the two sections 116 of the lower gate swing away from each other, under the action of the cam 124 operating against the arms 122, and release the pads to fall to the lower end of the bin 60 on to the ribbon-like, stationary center member 34 of the conveyor mechanism 90. The lower movable gates 116 swing back into their platform-forming position immediately after releasing the sanitary napkins.

The movement of the pusher rods 152 on the conveyor mechanism is timed so that each pair of these rods pass into the bin 60 (Figure 9) in time to remove a predetermined number of sanitary napkins therefrom (a dozen in the illustrated structure) in between opening movements of the lower gate structure 32. The stack of sanitary napkins are carried by the pusher rods 152 out to the end of the trough 137 where they are taken by suitable apparatus (not shown) and placed in a box or package in readiness for sale to the consumer.

Thus it is seen that each of the looped pads 21 momentarily comes to rest at three different stages in the stacking of the pads preparatory to packaging. These pauses occur at the upper gate 30, the lower gate 32, and at the platform 34 in the bottom of the bin 60. As previously indicated, the primary purpose of this arrangement is to provide for a continuous flow of looped pads from the loop-attaching mechanism. By thus interrupting the fall of the pads into the bin 60, the conveyor mechanism 90 at the lower end thereof can carry away a predetermined number of the sanitary pads without interference from the incoming pads in the upper portion of the bin. The timing of the action of the gates 30 and 32 and the pusher rods 152 on the conveyor 90 is synchronized with the speed of the pads being taken from the rotating drum 26 by the pick-up wheel 38 and the conveyor 62 to make it possible to prepare the pads for packaging, as rapidly as the pads are removed from the drum.

It will be seen from the foregoing that apparatus constructed in accordance with applicant's invention provides a simplified and economical means for collecting rapidly moving articles from a conveyor and accurately arranging same for packaging, without interrupting the continual flow of the finished articles from the machine manufacturing them. Furthermore, there is eliminated the need for the complicated and expensive ram arrangement which is commonly used to rapidly clear the collecting receptacle of articles in time to receive additional articles from the conveyor.

Applicant's invention provides for efficiently and carefully collecting continuously supplied articles in a limited space and does not rely on a minimum or predetermined distance from the article manufacturing machine in any way for timing the operation of the component parts of the embodiment of the invention. The careful and precise handling of the articles in the bin 60 further assures a neat stacking of the articles for packaging.

Although shown and described in connection with particular apparatus for handling sanitary napkins, it will be usable in most other instances wherein a predetermined quantity of articles or material is to be collected. Furthermore, it will be obvious that, although the operation of the parts in the bin 60 are described as involving cyclical movements, suitable means might be provided for counting the articles and controlling the movable gates 30 and 32 and conveyor 90 accordingly, without deviating from applicant's invention.

I claim:

1. Apparatus for handling a plurality of articles being supplied at spaced intervals to a given point comprising, a first platform disposed at said point to supportingly receive each of said articles in succession, said platform being movable relative to its supporting position, a second platform disposed in underlying relation to said first platform and supported for movement relative to said underlying position, a stationary support underlying said second platform, an endless conveyor associated with said stationary support including pusher elements fixed thereto in position for engagement with articles on said stationary support and means for cyclically operating said movable platforms and for continuously moving said conveyor so that said second platform moves relative to its position underlying said first platform after a predetermined number of operations of said first platform, and so that said pusher elements on said conveyor move through a given path after a predetermined number of operations of said second platform.

2. Apparatus for collecting a predetermined number of articles from a conveyor delivering said articles at spaced intervals to a given collecting point and for moving said predetermined number of articles to a position spaced from said collecting point comprising, a primary holding device disposed at said collecting point to receive each of said articles in succession and movable with respect to said collecting point, an intermediate holding device disposed in underlying relation to said primary holding device and movable with respect to said underlying position, a secondary holding device disposed in underlying relation to said intermediate holding device, a continuously operating endless conveyor mechanism associated with said secondary holding device, and means for cyclically operating said primary and intermediate holding devices and said endless conveyor mechanism so that said intermediate holding device operates after a predetermined number of operations of said primary holding device, and so that said secondary holding device and said associated conveyor cooperate to move the articles held by said secondary device to a position remote from said collecting point after a predetermined number of operations of said intermediate holding device.

3. Apparatus for handling a plurality of uniformly spaced articles being continuously supplied to a given station comprising, a first gate structure including a pair of relatively movable platform sections disposed at said station to supportingly receive each of said articles in succession, operating means for moving said platform sections away from each other, whereby said article will fall through the opening provided thereby, and for moving said platform sections back to their article-receiving position, a second gate structure underlying said first gate structure and also including a pair of relatively movable platform sections, means operating said second gate structure to move the platform sections thereof away from each other, when a predetermined number of said articles have accumulated thereon, and then toward each other in position to receive succeeding ones of said articles from said first gate structure, a support underlying said second gate structure to receive the articles released by said second gate structure, and a movable conveyor mechanism associated with said support and having elements fixed thereto in position for engagement with the articles on said support, said elements being spaced along said conveyor mechanism so that they move therewith into engagement with said articles when a predetermined number of said articles have accumulated on said support.

4. Apparatus for collecting a predetermined quantity of articles in a vertically stacked arrangement from a continuously moving supply comprising, a first endless conveyor means, a second endless conveyor means disposed in underlying relation to said first conveyor adjacent the terminal end thereof, a first gate-structure disposed in the path of movement of said first conveyor to receive articles therefrom, a second gate-structure disposed below said first gate-structure in vertical alignment therewith, a stationary platform disposed below said second gate-structure, said first gate-structure being operable to receive a single article from said first conveyor and being movable relative to its article-supporting position to deposit said article on said underlying second gate-structure, said second gate-structure being also operable to move relative to its article-supporting position to deposit articles collected thereon on said stationary platform, means for operating said first and second gate-structures in a predetermined sequence wherein said second gate-structure operates only after a predetermined number of operations of said first gate-structure and while said first gate-structure is in its article-supporting position, and means carried by said second conveyor for engagement with articles deposited on said stationary platform after a predetermined number of said articles are deposited thereon and only while said second platform structure is in its article supporting position.

5. Apparatus for handling a plurality of spaced articles being supplied successively to a given station comprising, a first platform supported at said station in relatively movable relation thereto, a second platform underlying said first platform and supported for movement relative to said underlying position, means for operating said platforms so that said first platform moves away from said given station and back thereto each time it receives one of said articles, and so that said second platform moves away from said underlying position and back thereto after a predetermined number of said articles have been stacked thereon, and additional means underlying said second platform to receive stacked articles from the latter as said second platform is moved away from said position underlying said first platform, said additional means being operable after said second platform has been operated a plurality of times to thus stack the desired number of articles on said additional means to move said desired number of articles to a remote position, and said additional means being operable only while said second platform is in said underlying position with respect to said first platform.

References Cited in the file of this patent

UNITED STATES PATENTS

| | | |
|---|---|---|
| 1,266,737 | Wood et al. | May 21, 1918 |
| 1,600,958 | Hart et al. | Sept. 21, 1926 |
| 2,039,203 | Ogilvy-Webb | Apr. 28, 1936 |
| 2,065,674 | Fay | Dec. 29, 1936 |
| 2,138,356 | Ryan et al. | Nov. 29, 1938 |
| 2,401,592 | Von Stocker | June 4, 1946 |
| 2,606,672 | Avery | Aug. 12, 1952 |

FOREIGN PATENTS

| | | |
|---|---|---|
| 434,189 | Germany | Sept. 22, 1926 |